United States Patent
Howell et al.

(10) Patent No.: US 10,150,457 B2
(45) Date of Patent: Dec. 11, 2018

(54) VALVE MODULE FOR AN AIR BRAKING SYSTEM OF A HEAVY VEHICLE

(71) Applicant: Bendix Commercial Vehicle Systems LLC, Elyria, OH (US)

(72) Inventors: David W Howell, Oak Ridge, NC (US); Paul C Niglas, Avon, OH (US); Michael D Tober, Avon, OH (US); Gerhard Wieder, Besigheim (DE)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 5 days.

(21) Appl. No.: 15/141,110

(22) Filed: Apr. 28, 2016

(65) Prior Publication Data

US 2017/0313291 A1 Nov. 2, 2017

(51) Int. Cl.
*B60T 8/36* (2006.01)
*B60T 15/02* (2006.01)
*B60T 15/18* (2006.01)
*F16K 15/00* (2006.01)
*F16K 31/06* (2006.01)
*B60T 7/12* (2006.01)
(Continued)

(52) U.S. Cl.
CPC ............ *B60T 8/362* (2013.01); *B60T 7/122* (2013.01); *B60T 8/327* (2013.01); *B60T 13/662* (2013.01); *B60T 13/683* (2013.01); *B60T 15/027* (2013.01); *B60T 15/18* (2013.01); *F16K 15/00* (2013.01); *F16K 31/06* (2013.01); *B60T 8/361* (2013.01); *B60T 2201/06* (2013.01)

(58) Field of Classification Search
CPC ........ B60T 8/362; B60T 15/027; B60T 15/18; B60T 2201/06; F16K 15/00; F16K 31/06

USPC .............. 303/118.1, 191, 192, 157; 137/204; 701/70
See application file for complete search history.

(56) References Cited

U.S. PATENT DOCUMENTS

| 3,827,760 | A | * | 8/1974 | Fleagle | B60T 8/17633 303/157 |
| 3,944,290 | A | * | 3/1976 | Goebels | B60T 8/361 303/118.1 |

(Continued)

OTHER PUBLICATIONS

Bendix Commercial Vehicle Systems LLC, "Quick Reference Catalog, Bendix AT-3 Traction Valves" Catalog, Dec. 2015, p. 110, Bendix Commercial Vehicle Systems LLC Elyria OH, USA.

(Continued)

*Primary Examiner* — Thomas J Williams
*Assistant Examiner* — Mariano Sy
(74) *Attorney, Agent, or Firm* — Cheryl L. Greenly; Brian E. Kondas; Eugene E. Clair

(57) ABSTRACT

A valve module is provided for enabling a vehicle to control an autonomous event of the vehicle. The valve module comprises a relay valve, a first solenoid valve, and a second solenoid valve. A first control pressure can be delivered through the first solenoid valve and applied to a control port of the relay valve. In one embodiment, a second control pressure can be delivered through the second solenoid valve and combined with the first control pressure. The combined first and second control pressures are applied to the control port of the relay valve. In another embodiment, a second control pressure can be delivered through the second solenoid valve only when no first control pressure is delivered through the first solenoid valve.

9 Claims, 7 Drawing Sheets

(51) Int. Cl.
  *B60T 8/32* (2006.01)
  *B60T 13/66* (2006.01)
  *B60T 13/68* (2006.01)

(56) References Cited

U.S. PATENT DOCUMENTS

| | | | | |
|---|---|---|---|---|
| 4,025,127 A * | 5/1977 | Rembold | ............ | B60T 8/5006 |
| | | | | 303/118.1 |
| 4,838,617 A * | 6/1989 | Deitchman | ............ | B60T 7/12 |
| | | | | 180/271 |
| 4,861,115 A * | 8/1989 | Petersen | ............ | B60T 8/268 |
| | | | | 303/118.1 |
| 5,133,593 A * | 7/1992 | Woerner | ............ | B60T 8/361 |
| | | | | 303/118.1 |
| 5,439,277 A * | 8/1995 | Higashi | ............ | B60T 8/17616 |
| | | | | 303/113.1 |
| 5,762,094 A * | 6/1998 | Hendershot | ............ | B60T 15/18 |
| | | | | 137/204 |
| 8,078,378 B2 | 12/2011 | Bradley | | |
| 8,260,520 B2 * | 9/2012 | Eberling | ............ | B60T 7/20 |
| | | | | 701/81 |
| 8,869,831 B2 | 10/2014 | Haehn | | |
| 9,045,119 B2 | 6/2015 | Burkert | | |
| 2007/0236084 A1 * | 10/2007 | Frank | ............ | B60T 8/327 |
| | | | | 303/119.2 |
| 2009/0280959 A1 * | 11/2009 | Bensch | ............ | B60T 8/1708 |
| | | | | 477/198 |
| 2010/0072810 A1 * | 3/2010 | Bensch | ............ | B60T 8/362 |
| | | | | 303/17 |
| 2010/0168974 A1 * | 7/2010 | Bradley, IV | ............ | B60T 7/122 |
| | | | | 701/70 |
| 2012/0217794 A1 * | 8/2012 | Wieder | ............ | B60T 15/027 |
| | | | | 303/113.2 |
| 2012/0312645 A1 | 12/2012 | Frashure | | |
| 2013/0073165 A1 | 3/2013 | Roether | | |
| 2013/0214588 A1 * | 8/2013 | Kiel | ............ | B60T 13/683 |
| | | | | 303/6.01 |
| 2014/0183936 A1 | 7/2014 | Kinoshita | | |

OTHER PUBLICATIONS

Bendix Commercial Vehicle Systems LLC, "SD-13-4861 Bendix ATR-6 and ATR-3 Antilock Traction Relay Valves," Service Data Sheet, Apr. 2008, 8 pages, Bendix Commercial Vehicle Systems LLC, Elyria OH USA.

Bendix Commercial Vehicle Systems LLC, "SD-03-1064 Bendix R-12 & R-14 relay Valves," Service Data Sheet, May 2010, 6 pages, Bendix Commercial Vehicle Systems LLC, Elyria OH USA.

Bendix Commercial Vehicle Systems LLC, "SD-03-2205 Bendix SS-3 In Line Single Check Valves," Service Data Sheet, Mar. 2007, 2 pages, Bendix Commercial Vehicle Systems LLC, Elyria OH USA.

* cited by examiner

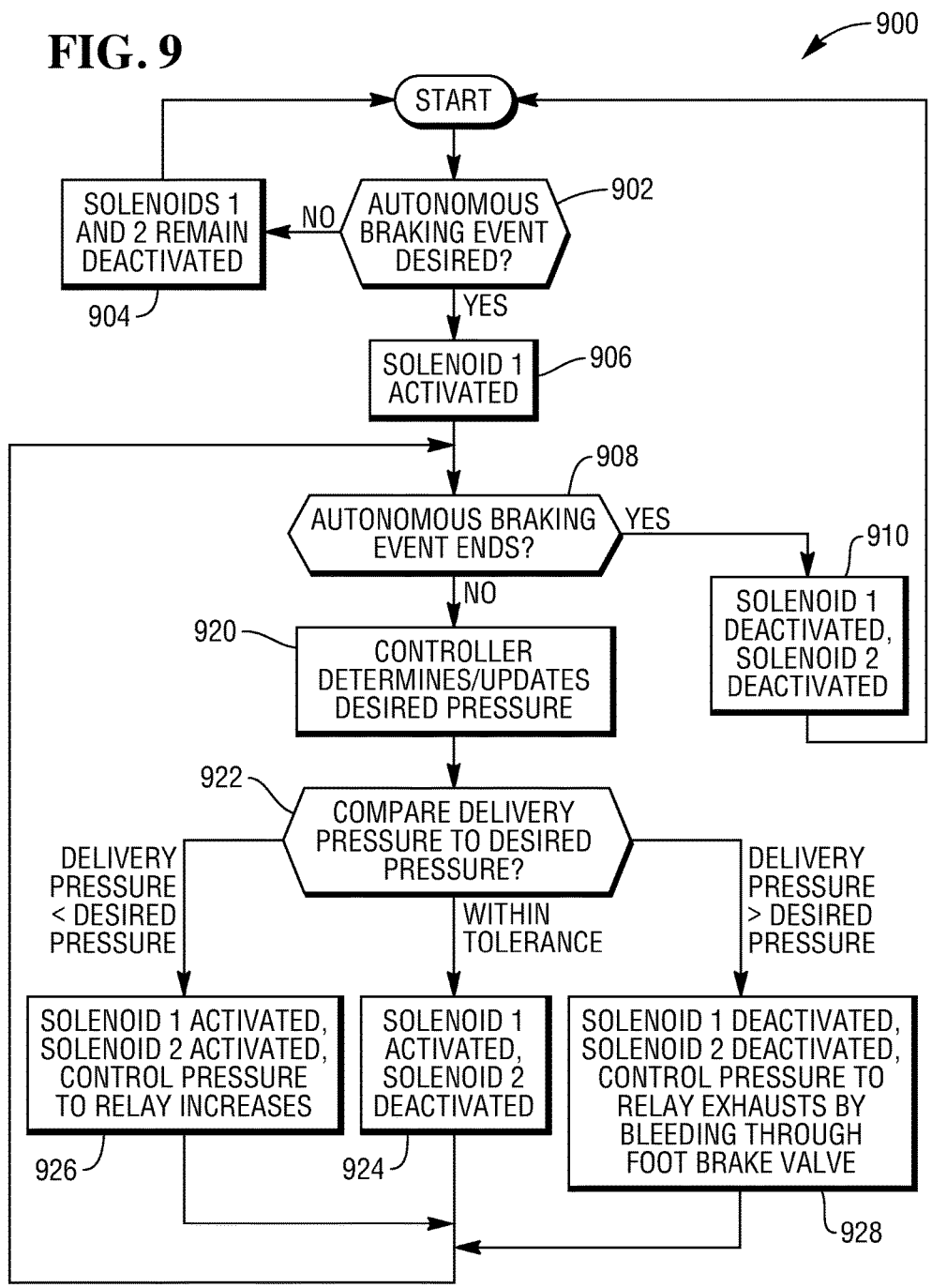

VALVE MODULE FOR AN AIR BRAKING SYSTEM OF A HEAVY VEHICLE

BACKGROUND

The present application relates to heavy vehicle air braking systems, and is particularly directed to a valve module for an air braking system of a heavy vehicle, such as a truck.

A typical air braking system includes an anti-lock brake system (ABS) that has a number of ABS modulator valves. The ABS modulator valves are controlled in response to electrical control signals from an ABS controller to modulate air flow to service brake chambers to prevent locking of braked wheels to improve the braking characteristics of the heavy vehicle. The ABS modulator valves in some heavy vehicles are controlled to control not only an anti-lock braking event, but also to control other types of autonomous braking events that are auxiliary to the normal service braking function of the heavy vehicle. An example autonomous braking event that is auxiliary to the normal service braking function comprises hill start assist (HSA). HSA prevents rolling back of the heavy vehicle when the vehicle is stationary on an uphill incline and the foot of the vehicle driver is transitioning from the vehicle foot brake pedal to the vehicle foot accelerator pedal to accelerate the vehicle from its stationary position on the uphill incline. It would be desirable to improve performance of autonomous braking events, such as HSA, in heavy vehicles.

SUMMARY

In accordance with an embodiment, a valve module is provided for a vehicle having a compressed air supply, a driver demand device for providing a driver demand pressure indicative of driver intent to apply brakes, one or more brake chambers, and a controller for controlling delivery of air flow through the valve module to the one or more brake chambers to control an autonomous braking event of the vehicle. The valve module comprises a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers. The valve module further comprises a first solenoid valve having a first solenoid, at least one supply port, and a delivery port connected in fluid communication with the control port of the relay valve, wherein the first solenoid is responsive to a first electrical signal from the controller to deliver a first control pressure from the driver demand device through the first solenoid valve to the control port of the relay valve to control air flow from the supply port of the relay valve through the relay valve to the delivery port of the relay valve to control air flow to the one or more brake chambers. The valve module also comprises a second solenoid valve having a second solenoid, at least one supply port, and a delivery port, wherein (i) the second solenoid is responsive to a second electrical signal from the controller to deliver a second control pressure to the first solenoid valve to combine with the first control pressure, and (ii) the combined first and second control pressures are applied to the control port of the relay valve to control air flow from the supply port of the relay valve through the relay valve to the delivery port of the relay valve to control air flow to the one or more brake chambers and thereby to control the autonomous braking event of the vehicle.

In accordance with another embodiment, a valve module is provided for a vehicle having a compressed air supply, a driver demand device for providing a driver demand pressure indicative of driver intent to apply brakes, one or more brake chambers, and a controller for controlling delivery of air flow through the valve module to the one or more brake chambers to control an autonomous braking event of the vehicle. The valve module comprises a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers. The valve module further comprise a first solenoid valve having a first solenoid, a supply port, and a delivery port connected in fluid communication with the control port of the relay valve. The valve module also comprises a second solenoid valve having a second solenoid, a supply port, and a delivery port connected in fluid communication with the control port of the relay valve, wherein (i) the first solenoid is responsive to a first electrical signal from the controller to deliver a first control pressure from the driver demand device to the supply port of the first solenoid valve through the first solenoid valve to the control port of the relay valve to control air flow from the supply port of the relay valve through the relay valve to the delivery port of the relay valve to control air flow to the one or more brake chambers and thereby to control the autonomous braking event of the vehicle, and (ii) the second solenoid is responsive to a second electrical signal from the controller to deliver a second control pressure from the compressed air supply to the supply port of the second solenoid valve through the second solenoid valve to the control port of the relay valve only when no first control pressure is being delivered from the driver demand device through the first solenoid valve to the control port of the relay valve.

In accordance with still another embodiment, a valve module is provided for a vehicle having a compressed air supply, a driver demand device for providing a driver demand pressure indicative of driver intent to apply brakes, one or more brake chambers, and a controller for controlling delivery of air flow through the valve module to the one or more brake chambers to control an autonomous braking event of the vehicle. The valve module comprises a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers. The valve module further comprises a one-way check valve having an inlet port connectable in fluid communication with the driver demand device, and an outlet port. The valve module also comprises a first solenoid valve having a first supply port, a second supply port, a delivery port, and a solenoid that is controllable in response to a first electrical signal from the controller, wherein (i) the first supply port of the first solenoid valve is connected in fluid communication with the driver demand device, and (ii) the delivery port of the first solenoid valve is connected in fluid communication with the control port of the relay valve. The valve module further comprises a second solenoid valve having a first supply port, a second supply port, a delivery port, and a solenoid that is controllable in response to a second electrical signal from the controller, wherein (i) the first supply port of the second solenoid valve is connectable in fluid communication with the compressed air supply, (ii) the second supply port of the second solenoid valve is connected in fluid communication with atmosphere, and (iii) the delivery port of the second solenoid valve is connected in fluid communication with the second supply port of the first solenoid valve.

In accordance with yet another embodiment, a valve module is provided for a vehicle having a compressed air supply, a driver demand device for providing a driver demand input pressure indicative of driver intent to apply brakes, one or more brake chambers, and a controller for controlling delivery of air flow through the valve module to the one or more brake chambers to control an autonomous braking event of the vehicle. The valve module comprises a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers. The valve module further comprises a first solenoid valve having a supply port, a delivery port, and a solenoid that is controllable in response to a first electrical signal from the controller, wherein (i) the supply port of the first solenoid valve is connectable in fluid communication with driver demand device, and (ii) the delivery port of the first solenoid valve is connected in fluid communication with the control port of the relay valve. The valve module also comprises a second solenoid valve having a supply port, a delivery port, and a solenoid that is controllable in response to a second electrical signal from the controller, wherein (i) the supply port of the second solenoid valve is connectable in fluid communication with the compressed air supply, and (ii) the delivery port of the second solenoid valve is connected in fluid communication with the control port of the relay valve and the delivery port of the first solenoid valve. The valve module further comprises a one-way check valve having an inlet port connected in fluid communication with the supply port of the first solenoid valve and an outlet port connected in fluid communication with the control port of the relay valve and the delivery ports of the first and second solenoid valves.

BRIEF DESCRIPTION OF THE DRAWINGS

FIG. 9 is a flow diagram depicting a control method for the valve module of FIGS. 6-8 in accordance with an embodiment.

DETAILED DESCRIPTION

Figure 1:
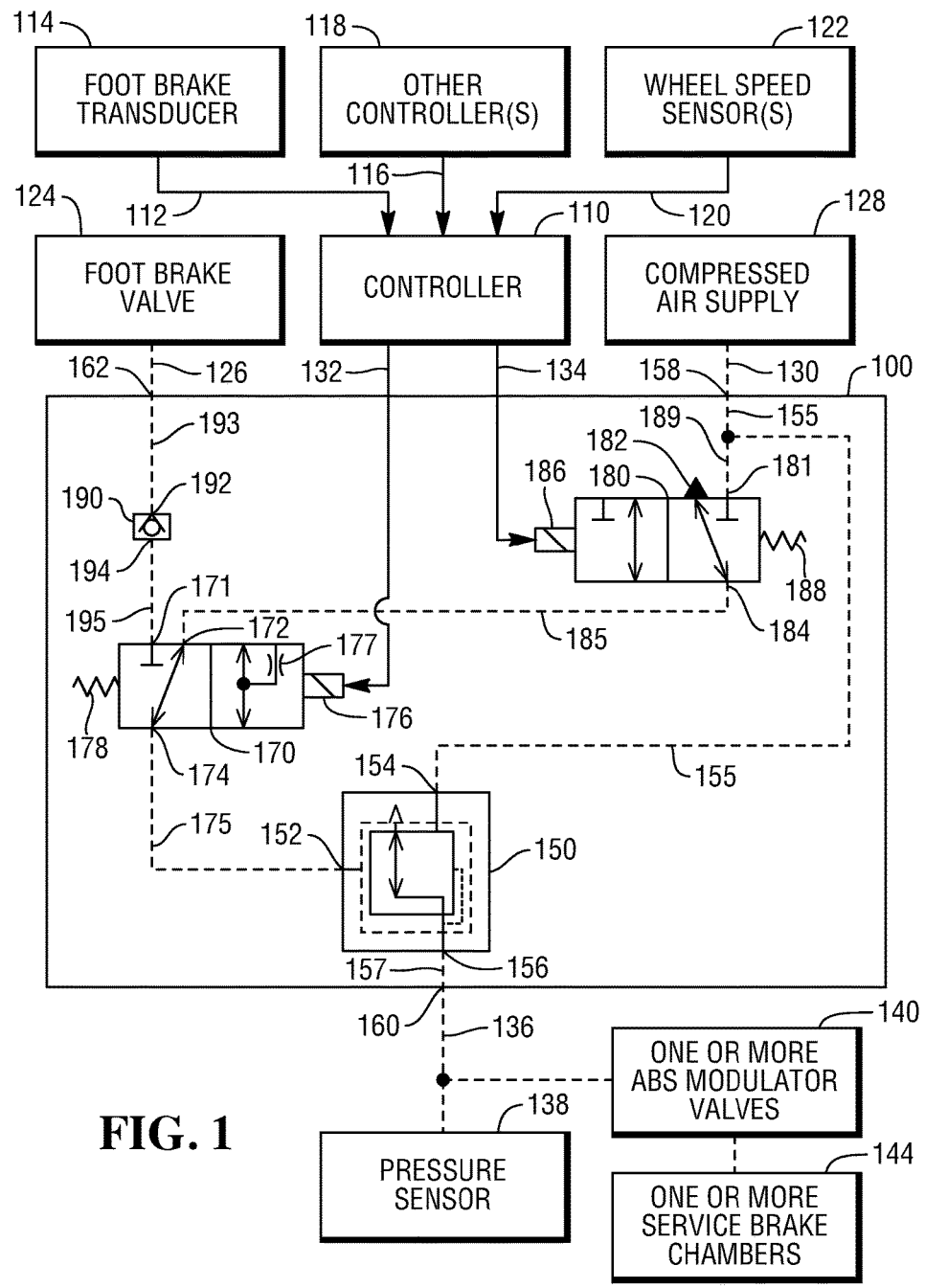
FIG. 1 is a schematic block diagram of a heavy vehicle air braking system embodying a valve module constructed in accordance with an embodiment.

Referring to FIG. 1, a schematic block diagram of valve module 100 constructed in accordance with an embodiment is illustrated. Valve module 100 is embodied in a heavy vehicle, such as a truck, that has a pneumatic braking system and is equipped with an anti-lock braking system (ABS). In FIG. 1, electrical line connections are shown as solid lines, and pneumatic lines connections are shown as dashed lines.

The braking system includes controller 110 that responds to signal on line 112 from foot brake transducer 114, one or more signals on line 116 from one or more other controllers 118, and one or more signals on line 120 from one or more wheel speed sensors 122. Controller 110 may also control ABS or may be dedicated to the operation of valve module 100.

Foot brake transducer 114 provides signal on line 112 in response to the vehicle driver depressing a foot brake pedal (not shown). Signal on line 112 is indicative of the vehicle driver's intent to apply service brakes of the vehicle. Structure and operation of the foot brake pedal and foot brake transducer 114 are known and, therefore, will not be described.

One or more other controllers 118 may include a transmission controller, for example, that provides signal on line 116 indicative of status of the vehicle transmission. Other types of controllers providing one or more signals on line 116 are possible. One or more wheel speed sensors 122 may be any type. Structure and operation of the wheel speed sensors are known and, therefore, will not be described.

The braking system further includes a driver demand device in the form of foot brake valve 124 that may comprise any type of commercially available foot brake valve. Foot brake pedal (not shown) may be part of foot brake valve 124, or may be separate from foot brake valve 124. Foot brake valve 124 provides pneumatic control signal in line 126 in response to the vehicle driver depressing the foot brake pedal. Structure and operation of foot brake valves and foot brake pedals are known and, therefore, will not be described. Pneumatic control signal in line 126 is connectable in fluid communication with air inlet port 162 of valve module 100.

Although the driver demand device in FIG. 1 is shown in the form of a foot-operated brake valve, it is conceivable that driver demand device may be in a different form. For example, the driver demand device may be in the form of a hand-operated brake valve. Other types of driver demand devices are possible.

The braking system also includes compressed air supply 128 that provides a source of compressed air in line 130. Compressed air in line 130 is connectable in fluid communication to air inlet port 158 of valve module 100.

Controller 110 provides electrical control signals on lines 132, 134 that are provided to valve module 100. Valve module 100 responds to electrical control signals on lines 132, 134 and pneumatic control signal in line 126 to control delivery of compressed air in line 130 to air outlet port 160 of valve module 100. Air outlet port 160 of valve module 100 is connectable in fluid communication with line 136. Line 136 is connected in fluid communication with one or more ABS modulator valves 140. Pressure sensor 138 may be connected in fluid communication with line 136 to monitor air pressure in line 136.

One or more ABS modulator valves 140 may be operatively connected to one or more service brake chambers 144 in known manner. When not activated, each of the one or more ABS modulator valves 140 allows air to pass directly therethrough. When activated, each of the one or more ABS modulator valves 140 modulate compressed air in line 136 to deliver modulated compressed air to the one or more service brake chambers 144. The number of service brake chambers depends on the number of axles of the particular vehicle. Accordingly, the number of ABS modulator valves and the number of pneumatic lines depends on the number of axles of the particular vehicle. Structure and operation of ABS modulator valves to control service brake chambers are known and, therefore, will not be described.

Valve module 100 responds to electrical control signals on lines 132, 134 and pneumatic control signal on line 126 to control delivery of compressed air flow from line 130 through valve module 100 to line 136 to control operation of the one or more service brake chambers 144, as will be described in detail hereinbelow.

Valve module 100 includes relay valve 150 having control port 152, supply port 154, and delivery port 156. Supply port 154 of relay valve 150 is connected in fluid communication in line 155 with air inlet port 158 that is connectable in fluid communication with line 130 from compressed air supply 128. Delivery port 156 of relay valve 150 is connected in line 157 with air outlet port 160 that is connectable in fluid communication with line 136 to the one or more ABS modulators 140.

Valve module 100 further includes one-way check valve 190 having inlet port 192 and outlet port 194. Inlet port 192 of one-way check valve 190 is connected in fluid communication in line 193 with air inlet port 162 of valve module 100. Outlet port 194 of one-way check valve 190 is connected in fluid communication in line 195 with first solenoid valve 170 of valve module 100.

First solenoid valve 170 includes first supply port 171, second supply port 172, delivery port 174, and activatable solenoid 176 that is controllable in response to electrical control signal on line 132 from controller 110. First supply port 171 of first solenoid valve 170 is connected in fluid communication in line 195 with output port 194 of one-way check valve 190. Delivery port 174 of first solenoid valve 170 is connected in fluid communication in line 175 with control port 152 of relay valve 150. First solenoid valve 170 has orifice 177 that will be described in detail later.

Valve module 100 further includes second solenoid valve 180 having first supply port 181, second supply port 182, delivery port 184, and activatable solenoid 186 that is controllable in response to electrical control signal on line 134 from controller 110. First supply port 181 of second solenoid valve 180 is connected in line 189 to line 155 to air inlet port 158 that is connectable in fluid communication in line 130 with compressed air supply 128. Second supply port 182 of second solenoid valve 180 is connected in fluid communication with atmosphere and acts as an exhaust port. Delivery port 184 of second solenoid valve 180 is connected in fluid communication in line 185 with second supply port 172 of first solenoid valve 170.

Figure 2:
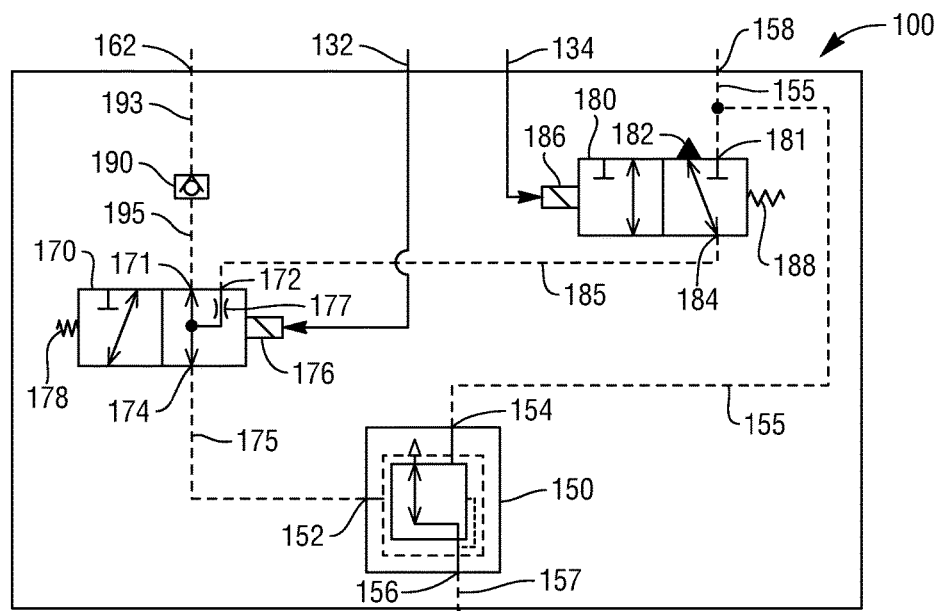
FIG. 2 is a schematic block diagram of the valve module of FIG. 1 with parts in another position.

First solenoid valve 170 may comprise an activatable 3/2 valve. A combination of first solenoid valve 170 and relay valve 150 shown in FIG. 1 may comprise Model No. ATR-6™ Valve commercially available from Bendix Commercial Vehicle Systems LLC located in Elyria, Ohio. When first solenoid valve 170 is activated in response to electrical control signal on line 132 from controller 110, first solenoid valve 170 moves from a first position as shown in FIG. 1 to a second position as shown in FIG. 2. In the first position of first solenoid valve 170 shown in FIG. 1, air is blocked from flowing through first supply port 171 of first solenoid valve 170 and air is allowed to flow from second supply port 172 of first solenoid valve 170 through first solenoid valve 170 to control port 152 of relay valve 150. In the second position of first solenoid valve 170 shown in FIG. 2, air is allowed to flow from both first and second supply ports 171, 172 through first solenoid valve 170 to control port 152 of relay valve 150. Spring 178 of first solenoid valve 170 returns first solenoid valve 170 from the second position shown in FIG. 2 back to the first position shown in FIG. 1 when solenoid 176 of first solenoid valve 170 is deactivated.

Figure 3:
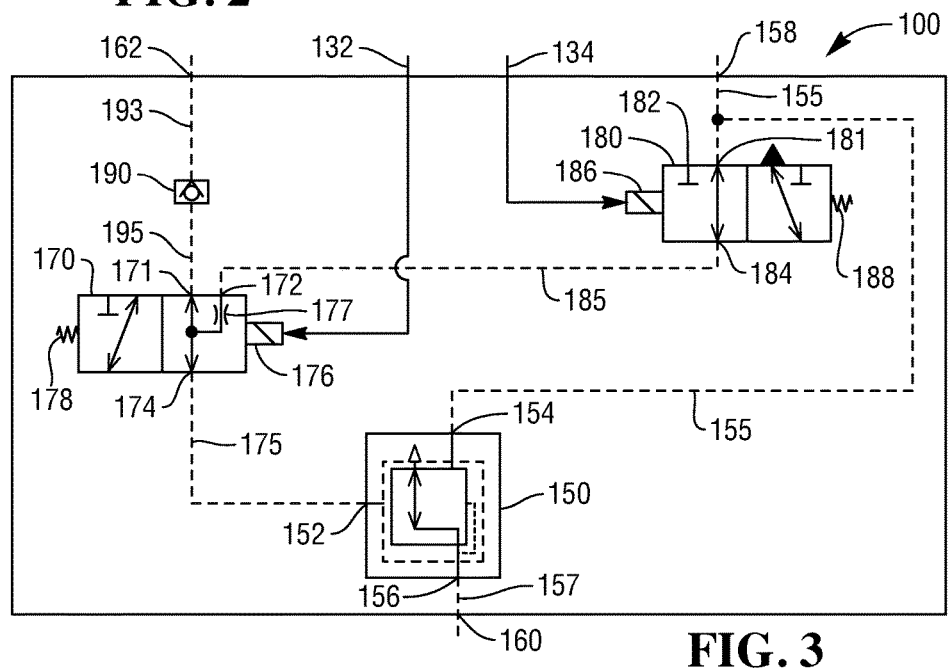
FIG. 3 is a schematic block diagram of the valve module of FIG. 2 with parts in yet another position.

Second solenoid valve 180 may comprise an activatable 3/2 valve, such as Model No. AT-3™ Valve commercially available from Bendix Commercial Vehicle Systems LLC located in Elyria, Ohio. When second solenoid valve 180 is activated in response to electrical control signal on line 134 from controller 110, second solenoid valve 180 moves from a first position as shown in FIG. 2 to a second position as shown in FIG. 3. In the first position of second solenoid valve 180 shown in FIG. 2, air is blocked from flowing through first supply port 181 of second solenoid valve 180 and air can be exhausted through second supply port 182. In the second position of second solenoid valve 180 shown in FIG. 3, air is allowed to flow from first supply port 181 of second solenoid valve 180 through second solenoid valve 180 to second supply port 172 of first solenoid valve 170. Spring 188 of second solenoid valve 180 returns second solenoid valve 180 from the second position shown in FIG. 3 back to the first position shown in FIG. 2 when solenoid 186 of second solenoid valve 180 is deactivated.

Relay valve 150 may comprise an air-operated, graduating directional control valve of high capacity and fast response. Relay valve 150 graduates, holds, and releases air pressure from brake chambers to which it is connectable. Relay valve 150 may comprise Model No. R-12® Valve commercially available from Bendix Commercial Vehicle Systems LLC located in Elyria, Ohio.

One-way check valve 190 may comprise any of a variety of types. For example, one-way check valve 190 may comprise Model No. SC-3™ Valve commercially available from Bendix Commercial Vehicle Systems LLC located in Elyria, Ohio. Output port 194 of one-way check valve 190 is connected in fluid communication with first solenoid valve 170 such that one-way check valve 190 is effectively connected in series with first solenoid valve 170.

Although the above description describes relay valve 150, first solenoid valve 170, second solenoid valve 180, and one-way check valve 190 as separate components within valve module 100, it is conceivable that any combination of these components may be integrated as a single physical unit.

The arrangement of valve module 100 in the braking system shown in FIG. 1 enables air to be controlled and delivered to the one or more service brake chambers 144 to affect an autonomous braking event that is auxiliary to the normal service braking function of the vehicle. Example autonomous braking events include hill start assist (HSA), traction control, electronic stability control, autonomous cruise control (ACC), and collision mitigation. Other types of autonomous braking events are possible. An autonomous braking event is generally any event where a controller (such as controller 110 in FIG. 1) is controlling components to increase pressure (or maintain pressure in the case of an HSA event) at control port 152 of relay valve 150 without any further driver input (or the driver removes foot from the foot pedal in the case of an HSA event). For purposes of description, only an HSA event is described in detail hereinbelow.

HSA prevents rolling back of the vehicle when the vehicle is stationary on an uphill incline and the foot of the vehicle driver is transitioning from the foot brake pedal to the foot accelerator pedal to accelerate the vehicle from its stationary position on the uphill incline.

When the vehicle driver initially depresses the foot brake pedal to stop the vehicle on an uphill incline, first solenoid valve 170 is in its first position shown in FIG. 1, and second solenoid valve 180 is also in its first position in FIG. 1. In the first position of first solenoid valve 170 shown in FIG. 1, air is blocked from flowing in line 195 through first solenoid valve 170 to line 175 to control port 152 of relay valve 150. Any air pressure in line 175 is exhausted from delivery port 174 through first solenoid valve 170 to second supply port 172 to line 185 to delivery port 184 through second solenoid valve 180 to second supply port 182 to atmosphere.

When controller 110 receives a combination of signals including signal on line 112 from foot brake transducer 114, signal on line 116 from one or more other controllers 118, and signal on line 120 from one or more wheel sensors 122 calling for HSA to be initiated, controller 110 provides electrical control signal on line 132 to activate solenoid 176 of first solenoid valve 170. When solenoid 176 activates, first solenoid valve 170 moves from its first position shown in FIG. 1 to its second position shown in FIG. 2.

In the second position of first solenoid valve 170 shown in FIG. 2, the control air pressure previously applied to control port 152 of relay 150 is "trapped" to hold the pressure in the one or more service chambers 144 and thereby to maintain application of the service brakes of the vehicle during HSA. More specifically, one-way check valve 190 operates to trap air pressure in line 195 and line 175 to control port 152 of relay valve 150.

When first solenoid valve 170 are in its second position shown in FIG. 2, the vehicle driver can increase the air pressure at control port 152 of relay valve 150 by depressing the foot brake pedal. When the vehicle driver depresses the foot brake pedal, the pressure in line 195 increases, and is passed through first solenoid valve 170 to line 175 to control port 152 of relay valve 150. The pressure applied to control port 152 of relay valve 150 is trapped, and is a driver demand pressure. The trapped air pressure in line 195 and line 175 provides HSA, and is not exhausted until first solenoid valve 170 is deactivated and returns to its first position shown in FIG. 1.

When first solenoid valve 170 is activated as shown in its second position in FIG. 2, second solenoid valve 180 is activatable to move from its first position shown in FIG. 2 to its second position shown in FIG. 3 to autonomously increase control pressure to control port 152 of relay valve 150. More specifically, when second solenoid valve 180 is activated and moves from its first position shown in FIG. 2 to its second position shown in FIG. 3, control pressure from compressed air supply 128 passes through second solenoid valve 180 which, in turn, passes through first solenoid valve 170 to combine with control air pressure of first solenoid valve 170 to increase control pressure to control port 152 of relay valve 150.

Second solenoid valve 180 can be activated after first solenoid valve 170 has been activated. For example, second solenoid valve 180 can be activated when a small air leak downstream from orifice 177 of first solenoid valve 170 occurs. Orifice 177 located in first solenoid valve 170 is provided to reduce the chance of unintentionally applying the service brakes of the vehicle in the event that there is a small air leak downstream from orifice 177, such as a small leak in relay valve 150. Orifice 177 allows the air in relay valve 150 to leak out faster than compressed air from compressed air supply 128 can be supplied through first and second solenoid valves 170, 180 to relay valve 150.

Figure 4:
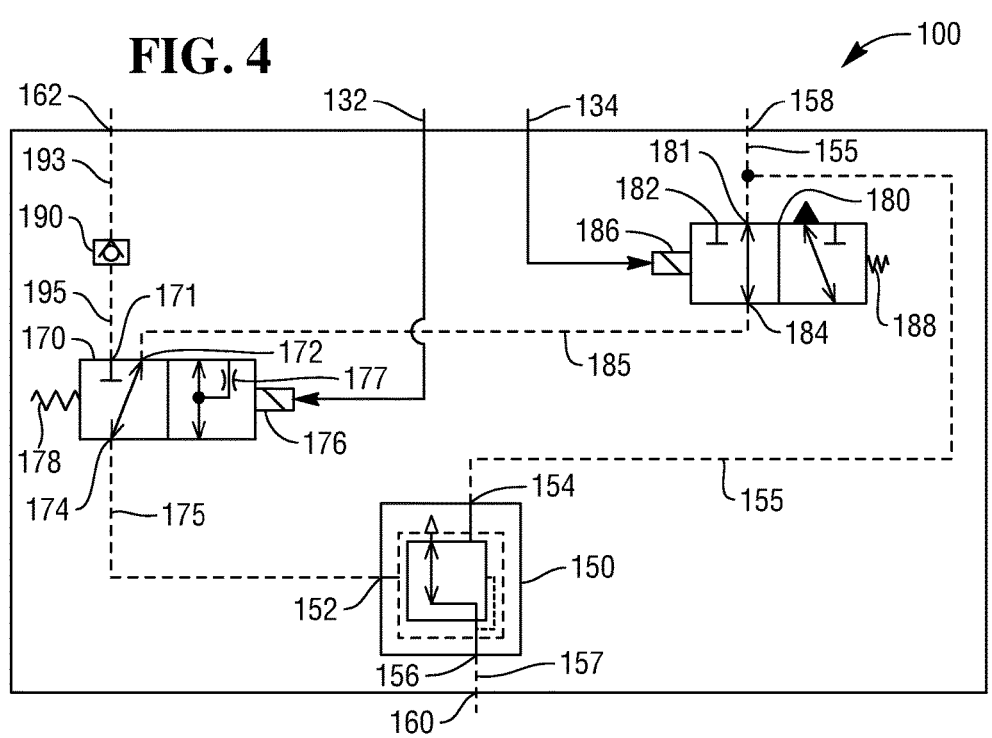
FIG. 4 is a schematic block diagram of the valve module of FIG. 3 with parts in still another position.

Also, second solenoid valve 180 can be activated without first solenoid valve 170 being activated. In this case, second solenoid valve 180 moves from its first position shown in FIG. 1 to its second position shown in FIG. 4. When second solenoid valve 180 is activated and first solenoid valve 170 is not activated, as shown in FIG. 4, full air pressure is being delivered from compressed air supply 128 through second solenoid valve 180 and first solenoid valve 170 to relay valve 150.

Figure 5:
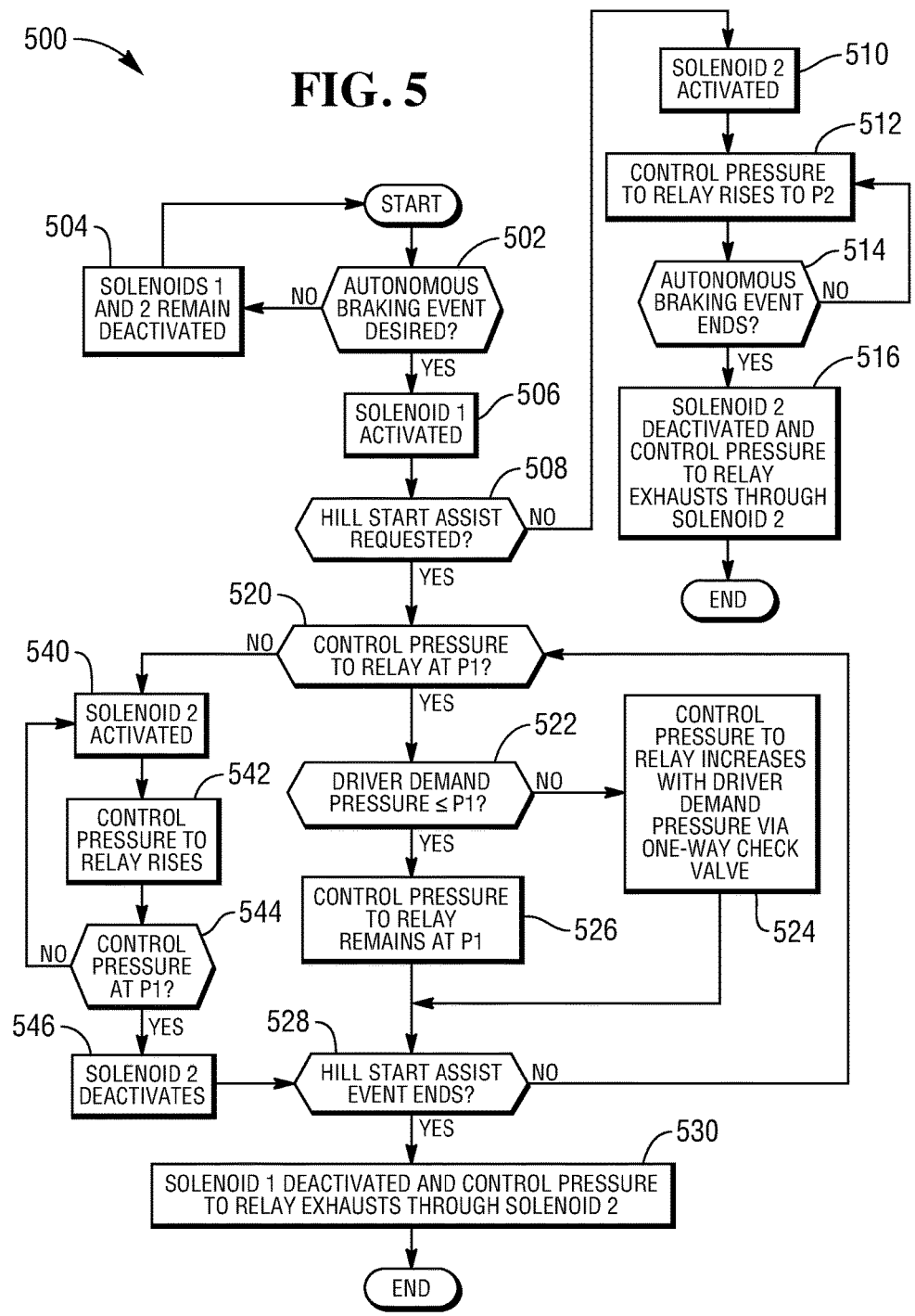
FIG. 5 is a flow diagram depicting a control method for the valve module of FIGS. 1-4 in accordance with an embodiment.

Referring to FIG. 5, flow diagram 500 depicts a control method for valve module 100 of FIGS. 1-4 in accordance with an embodiment. In block 502, a determination is made as to whether an autonomous braking event is desired. If determination in block 502 is negative (i.e., an autonomous braking is not desired), the process proceed to block 504. In block 504, both first solenoid valve 170 and second solenoid valve 180 remain deactivated as shown in their positions in FIG. 1. No control pressure is applied to control port 152 of relay valve 150. However, if determination in block 502 is affirmative (i.e., an autonomous braking event is desired), the process proceeds to block 506.

In block 506, first solenoid valve 170 is activated and moves from its first position shown in FIG. 1 to its second position shown in FIG. 2. A determination is then made in block 508 as to whether HSA is requested. If determination in block 508 is negative (i.e., HSA is not requested), the process proceeds to block 510. In block 510, second solenoid 180 is activated and moves from its first position shown in FIG. 2 to its second position shown in FIG. 3. Then, in block 512, air supply pressure from compressed air supply 128 is applied through second solenoid valve 180 and first solenoid valve 170 to control port 152 of relay valve 150. The control pressure at control port 152 rises to a pressure "P2". The process then proceeds to block 514.

In block 514, a determination is made as to whether the autonomous braking event has ended. If the determination in block is negative (i.e., the autonomous braking event has not ended), the process returns back to block 512. However, if the determination in block is affirmative (i.e., the autonomous braking event has ended), the process proceeds to block 516. In block 516, second solenoid valve 180 is deactivated and moves from its second position shown in FIG. 3 back to its first position shown in FIG. 2, and the control pressure at control port 152 of relay valve 150 is exhausted through first solenoid valve 170 and second solenoid valve 180 to atmosphere at second supply port 182 of second solenoid valve 182.

However, if the determination back in block 508 is affirmative (i.e., HSA is requested), the process proceeds to block 520. A determination is made in block 520 as to whether the control pressure that is being applied to control port 152 of relay valve 150 is at a pressure "P1". The pressure "P1" is a driver demand input pressure received from foot brake valve 124).

The pressure "P1" is set when the driver puts foot on the foot brake pedal and activates foot brake valve 124. The pressure "P1" is applied as the control pressure to control port 152 of relay valve 150. One-way check valve 190 allows the control pressure to control port 152 of relay valve 150 to increase if the driver demand pressure "P1" from foot brake valve 124 increases.

If determination in block 520 is negative (i.e., the control pressure that is being applied to control port 152 of relay valve 150 is not at the driver demand pressure "P1"), the process proceeds to block 540. In block 540, second solenoid valve 180 is activated and moves from its first position shown in FIG. 2 to its second position shown in FIG. 3.

When this occurs, the control pressure applied to control port 152 of relay valve 150 rises as shown in block 542 due to air supply pressure from compressed air supply 128 through second solenoid valve 180. The process proceeds to block 544 in which a determination is made as to whether the control pressure being applied to control port 152 of relay valve 150 has reached the driver demand pressure "P1".

If the determination in block 544 is negative (i.e., the control pressure applied to control port 152 of relay 150 has not reached the driver demand pressure "P1"), then the process returns back to block 540 and block 542 until the control pressure applied to control port 152 of relay 150 reaches the driver demand pressure "P1". When the determination is affirmative (i.e., the control pressure at control port 152 of relay valve 150 has reached the driver demand pressure "P1"), the process proceeds to block 546. In block 546, second solenoid valve 180 is deactivated and moves from its second position shown in FIG. 3 back to its first position shown in FIG. 2. The process then proceeds to block 528.

However, if the determination back in block 520 is affirmative (i.e., the control pressure that is being applied to control port 152 of relay valve 150 is at the driver demand pressure "P1"), the process proceeds to block 522. A determination is made in block 522 as to whether the current driver demand pressure being received from foot brake valve 124 is either maintained at pressure "P1" or has dropped below pressure "P1".

If determination in block 522 is negative (i.e., the current driver demand pressure being received from foot brake valve 124 is higher than the pressure "P1"), then the process proceeds to block 524. In block 524, the control pressure applied to control port 152 of relay valve 150 increases to the current driver input pressure being received from foot brake valve 124 via operation of one-way check valve 190. More specifically, after first solenoid valve 170 has been activated, one-way check valve 190 allows for increase of the control pressure that is being applied to control port 152 of relay valve 150 in response to an increase of driver demand pressure at the driver demand device. The process then proceeds to block 528.

However, if the determination back in block 522 is affirmative (i.e., the current driver demand pressure being received from foot brake valve 124 is either less than or equal to the pressure "P1"), the process proceed to block 526. In block 526, the pressure "P1" applied to control port 152 of relay valve 150 is maintained and remains at the pressure "P1". The process then proceeds to block 528.

In block 528, a determination is made as to whether the HSA has ended. HSA can end by either a timeout (three seconds from the activation of the HSA, for example) or the vehicle accelerating, for examples. If the determination in block 528 is negative (i.e., HSA has not ended), then the process returns back to block 520 to continue effecting HSA. However, if the determination in block 528 is affirmative (i.e., HSA has ended), then the process proceeds to block 530. In block 530, first solenoid valve 170 is deactivated and moves from its second position shown in FIG. 2 back to its first position shown in FIG. 1 such that the control pressure at control port 152 of relay valve 150 exhausts through first solenoid valve 170 and second solenoid valve 180 to second supply port 182 of second solenoid valve 180 to atmosphere. The process then ends.

Figure 6:
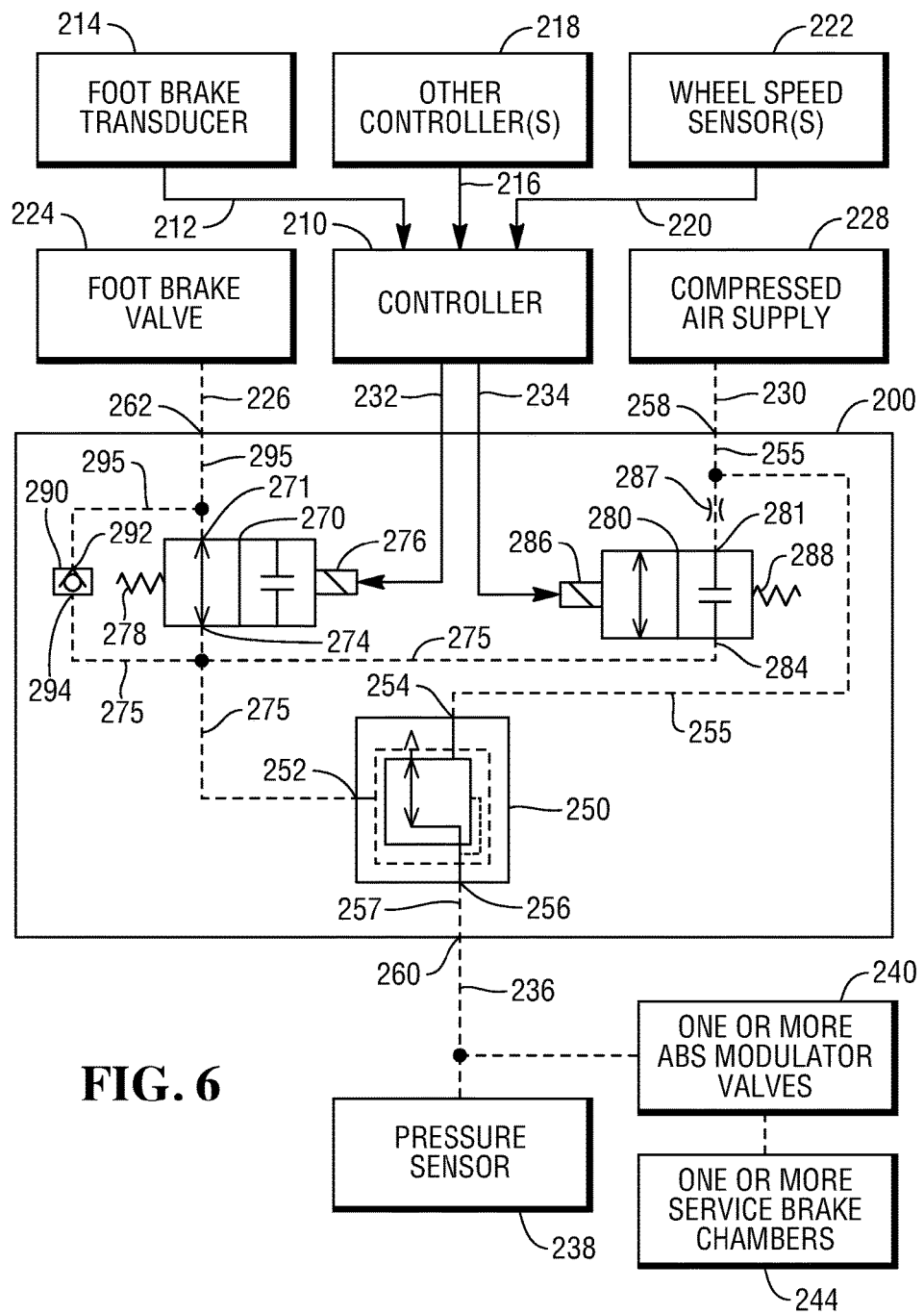
FIG. 6 is a schematic block diagram of a heavy vehicle air braking system embodying a valve module constructed in accordance with another embodiment.

Referring to FIG. 6, a schematic block diagram of valve module 200 constructed in accordance with an embodiment is illustrated. Valve module 200 is embodied in a heavy vehicle, such as a truck, that has a pneumatic braking system and is equipped with an anti-lock braking system (ABS). In FIG. 6, electrical line connections are shown as solid lines, and pneumatic lines connections are shown as dashed lines.

The braking system includes controller 210 that responds to signal on line 212 from foot brake transducer 214, one or more signals on line 216 from one or more other controllers 218, and one or more signals on line 220 from one or more wheel speed sensors 222. Controller 210 may also control ABS or may be dedicated to the operation of valve module 200.

Foot brake transducer 214 provides signal on line 212 in response to the vehicle driver depressing a foot brake pedal (not shown). Signal on line 212 is indicative of the vehicle driver's intent to apply service brakes of the vehicle. Structure and operation of the foot brake pedal and foot brake transducer 214 are known and, therefore, will not be described.

One or more other controllers 218 may include a transmission controller, for example, that provides signal on line 216 indicative of status of the vehicle transmission. Other types of controllers providing one or more signals on line 216 are possible. One or more wheel speed sensors 222 may be any type. Structure and operation of the wheel speed sensors are known and, therefore, will not be described.

The braking system further includes a driver demand device in the form of foot brake valve 224 that may comprise any type of commercially available foot brake valve. Foot brake pedal may be part of foot brake valve 224, or may be separate from foot brake valve 224. Foot brake valve 224 provides pneumatic control signal in line 226 in response to the vehicle driver depressing the foot brake pedal. Structure and operation of foot brake valves and foot brake pedals are known and, therefore, will not be described. Pneumatic control signal in line 226 is connectable in fluid communication with air inlet port 262 of valve module 200.

Although the driver demand device in FIG. 6 is shown in the form of a foot-operated brake valve, it is conceivable that driver demand device may be in a different form. For example, the driver demand device may be in the form of a hand-operated brake valve. Other types of driver demand devices are possible.

The braking system also includes compressed air supply 228 that provides a source of compressed air in line 230. Compressed air in line 230 is connectable in fluid communication to air inlet port 258 of valve module 200.

Controller 210 provides electrical control signals on lines 232, 234 that are provided to valve module 200. Valve module 200 responds to electrical control signals on lines 232, 234 and pneumatic control signal in line 226 to control delivery of compressed air in line 230 to air outlet port 260 of valve module 200. Air outlet port 260 of valve module 200 is connectable in fluid communication with line 236. Line 236 is connected in fluid communication with the one or more ABS modulator valves 240. Pressure sensor 238 may be connected in fluid communication with line 236 to monitor air pressure in line 236.

One or more ABS modulator valves 240 may be operatively connected to one or more service brake chambers 244 in known manner. When not activated, each of the one or more ABS modulator valves 240 allows air to pass directly therethrough. When activated, each of the one or more ABS modulator valves 240 modulate compressed air in line 236 to deliver modulated compressed air to the one or more service brake chambers 244. The number of service brake chambers depends on the number of axles of the particular vehicle. Accordingly, the number of ABS modulator valves and the number of pneumatic lines depends on the number of axles of the particular vehicle. Structure and operation of ABS modulator valves to control service brake chambers are known and, therefore, will not be described.

Valve module 200 responds to electrical control signals on lines 232, 234 and pneumatic control signal on line 226 to control delivery of compressed air flow from line 230 through valve module 200 to line 236 to control operation of the one or more service brake chambers 244, as will be described in detail hereinbelow.

Valve module 200 includes relay valve 250 having control port 252, supply port 254, and delivery port 256. Supply port 254 of relay valve 250 is connected in fluid communication in line 255 with air inlet port 258 that is connectable in fluid communication with line 230 from compressed air supply 228. Delivery port 256 of relay valve 250 is connected in line 257 with air outlet port 260 that is connectable in fluid communication with line 236 to the one or more ABS modulator valves 240.

Valve module 200 further includes first solenoid valve 270 having supply port 271, delivery port 274, and activatable solenoid 276 that is controllable in response to electrical control signal on line 232 from controller 210. Supply port 271 of first solenoid valve 270 is connected in line 295 to air inlet port 262 that is connectable in fluid communication in line 226 with an output port of foot brake valve 224. Delivery port 274 of first solenoid valve 270 is connected in fluid communication in line 275 with control port 252 of relay valve 250.

Valve module 200 also includes second solenoid valve 280 having supply port 281, delivery port 284, and activatable solenoid 286 that is controllable in response to electrical control signal on line 234 from controller 210. Supply port 281 of second solenoid valve 280 is connected through orifice 287 to line 255 to air inlet port 258 that is connectable in fluid communication in line 230 from compressed air supply 228. Delivery port 284 of second solenoid valve 280 is connected in fluid communication in line 275 with control port 252 of relay valve 250 and delivery port 274 of first solenoid valve 270.

Valve module 200 further includes one-way check valve 290 having inlet port 292 and outlet port 294. Inlet port 292 is connected in fluid communication in line 295 with supply port 271 of first solenoid valve 270 and air inlet port 262. Outlet port 294 of one-way check valve 290 is connected in fluid communication in line 275 with control port 252 of relay valve 250 and delivery ports 274, 284 of first and second solenoid valves 270, 280.

Figure 7:
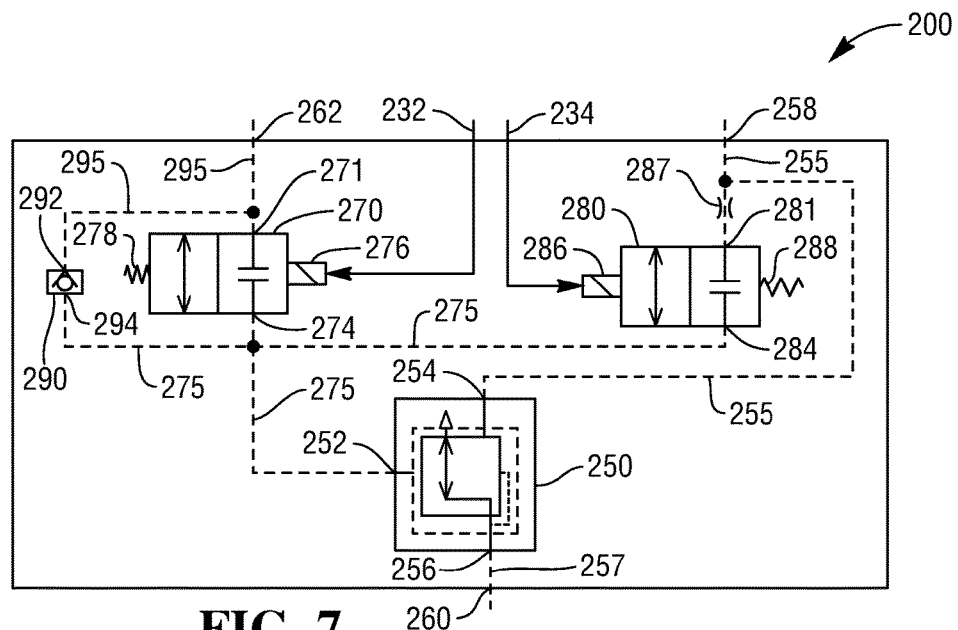
FIG. 7 is a schematic block diagram of the valve module of FIG. 6 with parts in another position.

First solenoid valve 270 may comprise an activatable 2/2 valve. First solenoid valve 270 is shown in FIG. 6 in a first position in which air is allowed to flow through first solenoid valve 270 to control port 252 of relay valve 250. When solenoid 276 of first solenoid valve 270 is activated in response to electrical control signal on line 232 from controller 210, first solenoid valve 270 moves from its first position shown in FIG. 6 to a second position as shown in FIG. 7 in which air is blocked from flowing from foot brake valve 224 through first solenoid valve 270 to control port 252 of relay valve 250. Spring 278 of first solenoid valve 270 returns first solenoid valve 270 from its second position shown in FIG. 7 back to its first position shown in FIG. 6 when solenoid 276 of first solenoid valve 270 is deactivated.

Figure 8:
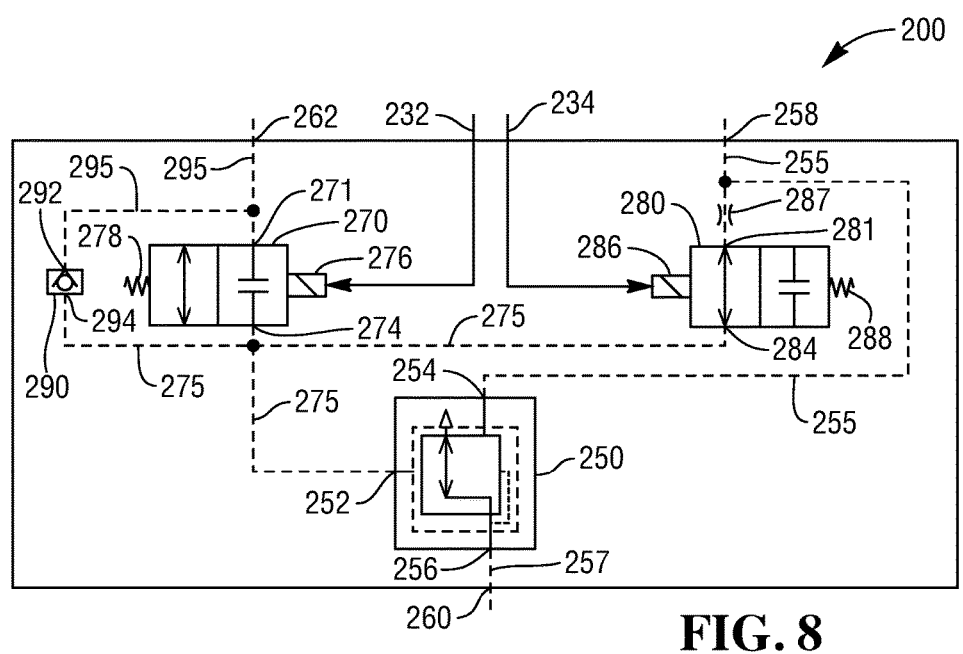
FIG. 8 is a schematic block diagram of the valve module of FIG. 7 with parts in yet another position.

Second solenoid valve 280 may comprise an activatable 2/2 valve. Second solenoid valve 280 shown in FIG. 7 is in a first position in which air is blocked from flowing from compressed air supply 228 through second solenoid valve 280 to control port 252 of relay valve 250. When solenoid 286 of second solenoid valve 280 is activated in response to electrical control signal on line 234 from controller 210, second solenoid valve 280 moves from its first position shown in FIG. 7 to a second position as shown in FIG. 8 in which air is allowed to flow from compressed air supply 228 through second solenoid valve 280 to control port 252 of relay valve 250. Spring 288 of second solenoid valve 280 returns second solenoid valve 280 from its second position shown in FIG. 8 back to its first position shown in FIG. 7 when solenoid 286 of second solenoid valve 280 is deactivated.

Relay valve 250 may comprise an air-operated, graduating directional control valve of high capacity and fast response. Relay valve 250 graduates, holds, and releases air pressure from brake chambers to which it is connectable.

One-way check valve 290 may comprise any of a variety of types. Output port 294 of one-way check valve 290 is connected in fluid communication with first solenoid valve 270 such that one-way check valve 290 is effectively connected in parallel with first solenoid valve 270.

Although the above description describes relay valve 250, first solenoid valve 270, second solenoid valve 280, and one-way check valve 290 as separate components within valve module 200, it is conceivable that any combination of these components may be integrated as a single physical unit.

The arrangement of valve module 200 in the braking system shown in FIG. 6 enables air to be controlled and delivered to the one or more service brake chambers to affect an autonomous braking event that is auxiliary to the normal service braking function of the vehicle. Example autonomous braking events include hill start assist (HSA), traction control, electronic stability control, autonomous cruise control (ACC), and collision mitigation. Other types of autonomous braking events are possible. An autonomous braking event is generally any event where a controller (such as controller 210 shown in FIG. 6) is controlling components to increase pressure (or maintain pressure in the case of an HSA event) at control port 252 of relay valve 250 without any further driver input (or the driver removes foot from the foot pedal in the case of an HSA event). For purposes of description, only an HSA event is described in detail hereinbelow.

HSA prevents rolling back of the vehicle when the vehicle is stationary on an uphill incline and the foot of the vehicle driver is transitioning from the foot brake pedal to the foot accelerator pedal to accelerate the vehicle from its stationary position on the uphill incline.

When the vehicle driver initially depresses the foot brake pedal to stop the vehicle on an uphill incline, first solenoid valve 270 is in its first position shown in FIG. 6, and second solenoid valve 280 is also in its first position shown in FIG. 6. In the first position of first solenoid valve 270 shown in FIG. 6, air flows from foot brake valve 224 through first solenoid valve 270 to line 275 to control port 252 of relay valve 250. This provides compressed air flow from compressed air supply 228 through relay valve 250 to line 257 through the one or more ABS modulator valves 240 to operate the one or more service brake chambers 244.

When controller 210 receives a combination of signals including signal on line 212 from foot brake transducer 214, signal on line 216 from one or more other controllers 218, and signal on line 220 from one or more wheel sensors 222 calling for HSA to be initiated, controller 210 provides electrical control signal on line 232 to activate solenoid 276 of first solenoid valve 270. When solenoid 276 activates, first solenoid valve 270 moves from its first position shown in FIG. 6 to the second position shown in FIG. 7.

When first solenoid valve 270 is in its second position shown in FIG. 7, air is blocked from flowing from foot brake valve 224 to line 295 through first solenoid valve 270 to line 275 to control port 252 of relay valve 250. In the second position of second solenoid valve 280 shown in FIG. 7, the control pressure previously applied to control port 252 of relay 250 becomes "trapped" to hold the pressure in the one or more service chambers 244 and thereby to maintain application of the service brakes of the vehicle during HSA.

When first solenoid valve 270 is in its second position shown in FIG. 7, the vehicle driver can increase the control pressure at control port 252 of relay valve 250 by depressing the foot brake pedal. When the vehicle driver depresses the foot brake pedal, the pressure in line 295 increases, and is passed through one-way check valve 290 to line 275 to control port 252 of relay valve 250. The pressure in line 295 is a driver demand pressure received from foot brake valve 224. More specifically, after first solenoid valve 270 has been activated, one-way check valve 290 allows for increase of control pressure that is being applied to control port 252 of relay valve 250 in response to an increase of driver demand pressure at foot brake valve 224. The driver demand pressure from foot brake valve 224 is delivered only through first solenoid valve 270 and not at all through second solenoid valve 280 to control port 252 of relay valve 250.

The control pressure applied to control port 252 of relay valve 250 is trapped. The trapped air pressure in line 275 provides HSA, and is not exhausted until first solenoid valve 270 is deactivated and returns back to its first position shown in FIG. 6. In FIG. 6, air trapped at control port 252 of relay valve 250 is exhausted through first solenoid valve 270 to foot brake valve 224 where air is bled to atmosphere.

Second solenoid valve 280 is activatable to move from its first position shown in FIG. 7 to its second position shown in FIG. 8 to autonomously increase control pressure to control port 252 of relay valve 250. When second solenoid valve 280 is activated and moves from its first position shown in FIG. 7 to its second position shown in FIG. 8, air supply pressure from compressed air supply 228 passes through second solenoid valve 280 to control port 252 of relay valve 250. This air pressure from compressed air supply 228 is applied to control port 252 of relay valve 250 only when no driver demand pressure is being delivered from foot brake valve 224 through first solenoid valve 270 to control port 252 of relay valve 250.

Second solenoid valve 280 would be activated only if first solenoid valve 270 is already activated. Otherwise, compressed air flowing through second solenoid valve 280 would exhaust back through first solenoid valve 270 and foot brake valve 224. Activation of second solenoid valve 280 without first solenoid valve 270 being already activated is not normal operation of valve module 200. Second solenoid valve 280 is activated only after first solenoid valve 270 has been activated. For example, second solenoid valve 280 can be activated when a small air leak downstream from orifice 287 occurs. As another example, second solenoid valve 280 can be activated when autonomous braking requires pressure greater than the driver demand pressure. Orifice 287 located between second solenoid valve 280 and compressed air supply 228 is provided to reduce the chance of unintentionally applying the service brakes of the vehicle in the event that there is a small air leak downstream from delivery port 284. Orifice 287 allows air to leak out faster than compressed air from compressed air supply 228 can be supplied.

Referring to FIG. 9, flow diagram 900 depicts a control method for valve module 200 of FIGS. 6-8 in accordance with an embodiment. In block 902, a determination is made as to whether an autonomous braking event is desired. If determination in block 902 is negative (i.e., an autonomous braking is not desired), the process proceed to block 904. In block 904, both first solenoid valve 270 and second solenoid valve 280 remain deactivated as shown in their positions in FIG. 6. No pressure is applied to control port 252 of relay valve 250. However, if determination in block 902 is affirmative (i.e., an autonomous braking event is desired), the process proceeds to block 906.

In block 906, first solenoid valve 270 is activated and moves from its first position shown in FIG. 6 to its second position shown in FIG. 7. The process then proceeds to block 908. In block 908, a determination is made as to whether the desired autonomous braking event has ended. If the determination in block is affirmative (i.e., the autonomous braking event has ended), the process proceeds to block 910. In block 910, both first solenoid valve 270 and second solenoid valve 280 are deactivated and are in their positions shown in FIG. 6. The process returns back to block 902.

However, if determination in block 908 is negative (i.e., the autonomous braking event has not ended), then the process proceeds to block 920. In block 920, controller 210 determines or updates the desired pressure required by controller 210 before proceeding to block 922. In block 922, the pressure being delivered to control port 252 of relay valve 250 and the desired pressure of controller 210 are compared.

If the pressure being delivered to control port 252 of relay valve 250 and the desired pressure of controller 210 are within a predefined tolerance (e.g., ±5%), then the process proceeds to block 924. In block 924, first solenoid valve 270 is activated and second solenoid valve 280 is deactivated, as shown in FIG. 7. The process then returns back to block 908 to continue affecting the autonomous braking event.

If the pressure being delivered to control port 252 of relay valve 250 is less than the desired pressure of controller 210, then the process proceeds to block 926. In block 926, first solenoid valve 270 is activated and second solenoid valve 280 is also activated, as shown in FIG. 8. The process then returns back to block 908 to continue affecting the autonomous braking event.

If the pressure being delivered to control port 252 of relay valve 250 is greater than the driver demand input pressure being received from foot brake valve 224, then the process proceeds to block 928. In block 928, first solenoid valve 270 is deactivated and second solenoid valve 280 is also deactivated, as shown in FIG. 6. When this occurs, the pressure at control port 252 of relay valve 250 is exhausted through first solenoid valve 270 and foot brake valve 224 by bleeding through foot brake valve 224. The process loops back to block 908.

It should be apparent that the combination of first solenoid valves 170, 270, second solenoid valves 180, 280, one-way check valves 190, 290, and relay valves 150, 250 in each of valve modules 100, 200, respectively, co-operate to trap brake pressure within the valve module to support an autonomous braking event, such as HSA, of the vehicle.

Although the above description describes valve module 100 of FIG. 1 and valve module 200 of FIG. 6 being embodied in a vehicle having ABS modulator valves and a controller that controls the ABS modulator valves, it is conceivable that each of valve modules 100, 200 can be embodied in a vehicle that is not equipped with ABS modulator valves. In this case, another controller would be used to control air flow through either valve module 100 of FIG. 1 or valve module 200 of FIG. 6 to service brake chambers. Accordingly, components within each of valve modules 100, 200 can be used to control air pressure to provide desired brake application pressure without having to rely on ABS modulator valves.

A number of advantages are provided by using the arrangement of valve module 100 in the braking system shown in FIG. 1 or the arrangement of valve module 200 in the braking system shown in FIG. 6. One advantage is that when air pressure is exhausted from one or more service brake chambers, the air flow is exhausted through only a minimum number of valves within valve module 100 of FIG. 1 or valve module 200 of FIG. 6.

More specifically, for valve module 100 of FIG. 1, air pressure from the one or more service brake chambers 144 would exhaust through only first solenoid valve 170 and second solenoid valve 180. For valve module 200 of FIG. 6, air pressure from service brake chambers 244, 246 would exhaust through only first solenoid valve 270 and subsequently bled to atmosphere through foot brake valve 224. In each case, air pressure from service brake chambers exhausts through no more than two valves within the particular valve module. By exhausting air pressure from service brake chambers through no more than two valves, restrictions to air flow are minimal. The result is more efficient air flow and, therefore, a higher performance system for affecting an autonomous braking event.

Another advantage is that each of valve modules 100, 200 requires only a relatively small number of components. Also, the components are non-complex and are relatively low cost. Accordingly, an autonomous braking event, such as HSA, is supported at relatively low cost.

Still another advantage is that a modulating control air pressure provides variable pressure control of autonomous braking events. A variable pressure control approach to autonomous braking events, such as HSA, avoids the need for a fixed-pressure worst case approach in which the highest pressure needed for the maximum grade angle is used. Since high pressure applications are avoided, the life of braking valve components is extended without having to provide more durable braking valve components.

Other advantages include improved brake balance and the ability to modulate the pressure upstream of ABS modulator valves.

While the present disclosure has been illustrated by the description of example processes and system components, and while the various processes and components have been described in detail, applicant does not intend to restrict or in any limit the scope of the appended claims to such detail. Additional modifications will also readily appear to those skilled in the art. The disclosed in its broadest aspects is therefore not limited to the specific details, implementations, or illustrative examples shown and described. Accordingly, departures may be made from such details without departing from the spirit or scope of applicant's general disclosed concept.

What is claimed is:

1. A valve module for a vehicle having a compressed air supply, a driver demand device for providing a driver demand pressure indicative of driver intent to apply brakes, one or more brake chambers, and a controller for controlling delivery of air flow through the valve module to the one or more brake chambers to control an autonomous braking event of the vehicle, the valve module comprising:

a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers;

a first solenoid valve having a first solenoid, a supply port, and a delivery port connected in fluid communication with the control port of the relay valve; and a second solenoid valve having a second solenoid, a supply port, and a delivery port connected in fluid communication with the control port of the relay valve, wherein (i) the first solenoid is responsive to a first electrical signal from the controller to deliver a first control pressure from the driver demand device at the supply port of the first solenoid valve through the first solenoid valve to the control port of the relay valve to control air flow from the supply port of the relay valve through the relay valve to the delivery port of the relay valve to control air flow to the one or more brake chambers and thereby to control the autonomous braking event of the vehicle, and (ii) the second solenoid is responsive to a second electrical signal from the controller to deliver a second control pressure control signal from the compressed air supply delivered through an orifice to the supply port of the second solenoid valve through the second solenoid valve to the control port of the relay valve only when no first control pressure is being delivered from the driver demand device through the first solenoid valve to the control port of the relay valve and (iii) the control port of the relay valve is exhausted through the driver demand device in response to the termination of the first electrical signal at the first solenoid and the termination of the second electrical signal at the second solenoid.

2. The valve module according to claim 1, further comprising:

a one-way check valve having an inlet port connectable in fluid communication with the driver demand device and being operatively connected in fluid communication with the first solenoid valve, wherein:

after the first solenoid valve has been activated, the one-way check valve allows for increase of the first control pressure that is being applied to the control port of the relay valve in response to an increase of driver demand pressure at the driver demand device.

3. The valve module according to claim 2, wherein the first control pressure control signal from the driver demand device is delivered only through the first solenoid valve and not at all through the second solenoid valve to the control port of the relay valve.

4. The valve module according to claim 3, wherein an output port of the one-way check valve is connected in fluid communication with the first solenoid valve such that the one-way check valve is effectively connected in parallel with the first solenoid valve.

5. The valve module according to claim 1, wherein the first solenoid valve comprises an activatable 2/2 valve that, when activated in response to the first electrical signal from the controller, moves from a first position in which air is allowed to flow through the first solenoid valve to the control port of the relay valve to a second position in which air is blocked from flowing through the first solenoid valve to the control port of the relay valve.

6. The valve module according to claim 5, wherein the second solenoid valve comprises an activatable 2/2 valve that, when activated in response to the second electrical signal from the controller, moves from a first position in which air is blocked from flowing through the second solenoid valve to the control port of the relay valve to a second position in which air is allowed to flow through the second solenoid valve to the control port of the relay valve.

7. The valve module according to claim 1, wherein the relay valve comprises an air-operated, graduating directional control valve.

8. The valve module according to claim 1, wherein the autonomous braking event comprises hill start assist (HSA).

9. A valve module for a vehicle having a compressed air supply, a driver demand device for providing a driver demand input pressure indicative of driver intent to apply brakes, one or more brake chambers, and a controller for controlling delivery of air flow through the valve module to the one or more brake chambers to control an autonomous braking event of the vehicle, the valve module comprising:
- a relay valve having a control port, a supply port, and a delivery port, wherein (i) the supply port of the relay valve is connectable in fluid communication with the compressed air supply, and (ii) the delivery port of the relay valve is connectable in fluid communication with the one or more brake chambers;
- a first solenoid valve having a supply port, a delivery port, and a solenoid that is controllable in response to a first electrical signal from the controller, wherein (i) the supply port of the first solenoid valve is connectable in fluid communication with the driver demand device, and (ii) the delivery port of the first solenoid valve is connected in fluid communication with the control port of the relay valve;
- a second solenoid valve having a supply port, a delivery port, and a solenoid that is controllable in response to a second electrical signal from the controller, wherein (i) the supply port of the second solenoid valve is connectable in fluid communication through an orifice with the compressed air supply, and (ii) the delivery port of the second solenoid valve is connected in fluid communication with the control port of the relay valve and the delivery port of the first solenoid valve; and
- a one-way check valve having an inlet port connected in fluid communication with the supply port of the first solenoid valve and an outlet port connected in fluid communication with the control port of the relay valve and the delivery ports of the first and second solenoid valves; wherein
(i) the first solenoid valve comprises an activatable 2/2 valve that, when activated in response to the first electrical signal from the controller, moves from a first position in which air is allowed to flow through the first solenoid valve to the control port of the relay valve to a second position in which air is blocked from flowing through the first solenoid valve to the control port of the relay valve;
(ii) the second solenoid valve comprises an activatable 2/2 valve that, when activated in response to the second electrical signal from the controller, moves from a first position in which air is blocked from flowing through the second solenoid valve to the control port of the relay valve to a second position in which air is allowed to flow through the second solenoid valve to the control port of the relay valve; and
(iii) the relay valve comprises an air-operated, graduating directional control valve; wherein air is exhausted from the control port of the relay valve through the driver demand device in response to the first solenoid valve and the second solenoid valve being deactivated.

* * * * *